(12) United States Patent
Tan et al.

(10) Patent No.: US 7,280,770 B2
(45) Date of Patent: Oct. 9, 2007

(54) POLARIZATION DIVERSE OPTICAL RECEIVER USING A POLARIZATION-DEPENDENT BEAM SPLITTER

(75) Inventors: Tun S. Tan, Los Altos Hills, CA (US); Doug Baney, Los Altos, CA (US); William Ian McAlexander, Redwood City, CA (US); Richard P. Tella, Sunnyvale, CA (US)

(73) Assignee: Agilent Technologies, Santa Clara, CA (US)

( * ) Notice: Subject to any disclaimer, the term of this patent is extended or adjusted under 35 U.S.C. 154(b) by 529 days.

(21) Appl. No.: 10/848,229

(22) Filed: May 18, 2004

(65) Prior Publication Data

US 2005/0259907 A1 Nov. 24, 2005

(51) Int. Cl.
*H04B 10/00* (2006.01)

(52) U.S. Cl. .................... 398/205; 398/207; 398/212
(58) Field of Classification Search ......... 398/202–214
See application file for complete search history.

(56) References Cited

U.S. PATENT DOCUMENTS 5,003,626 A * 3/1991 Kuwahara et al. .......... 398/204

* cited by examiner

*Primary Examiner*—Agustin Bello

(57) ABSTRACT

A receiver and method for using the same to process optical signals is disclosed. The receiver includes an optical coupler and a polarization dependent beam splitter. The optical coupler combines an input signal and a local oscillator signal into a first combined signal. The optical coupler includes a polarization filter that operates on the local oscillator to provide a linearly polarized signal having a predetermined LO polarization direction.

8 Claims, 3 Drawing Sheets

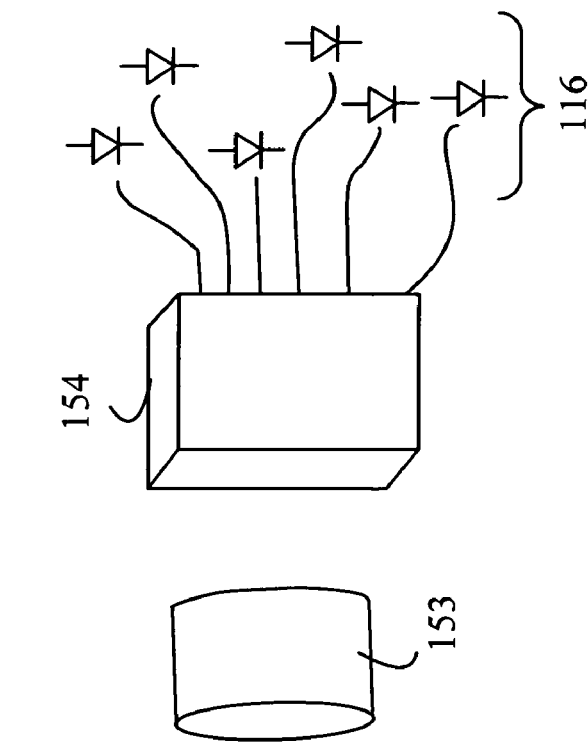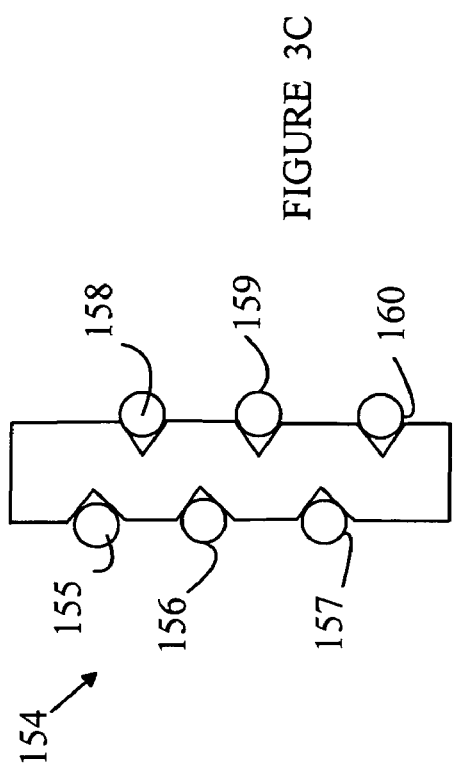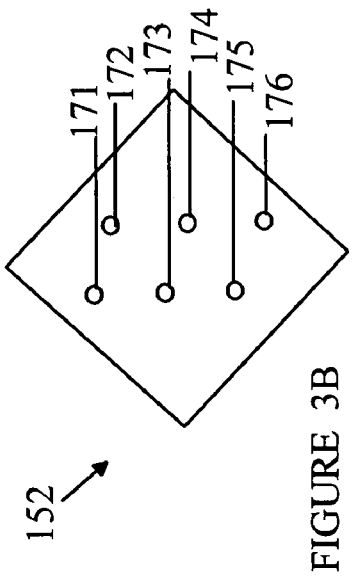

POLARIZATION DIVERSE OPTICAL RECEIVER USING A POLARIZATION-DEPENDENT BEAM SPLITTER

BACKGROUND OF THE INVENTION

Optical heterodyne detection systems involve mixing an input signal with a local oscillator signal and detecting the resulting beat frequency. Optical heterodyne detection systems can be utilized for optical spectrum analysis of an input optical signal by mixing the input signal with a local oscillator signal that is swept across a range of wavelengths or frequencies. Heterodyne-based optical signal analyzers can provide very high resolution, and are used for monitoring and analyzing communication systems based on dense wavelength division multiplexing.

The heterodyne signal is highly dependent on the polarization of the light in both the unknown input signal and the local oscillator. Hence, a mechanism must be provided to remove this source of variability from optical heterodyne-based optical receivers. If the polarization of the local oscillator is constant over time and does not vary with frequency while the oscillator is swept, a polarization diverse receiver can be achieved by dividing both the input signal and the local oscillator into two orthogonal polarization components and measuring the amplitude of the beat frequency obtained with each of the orthogonal polarizations. The results of the measurements at each polarization are then combined.

Such polarization diverse receivers utilize a polarization rotator and a walk-off crystal to generate four optical signals that provide the optical signals that are combined to produce the polarization diverse measurement. Two of these signals correspond to one of the orthogonal polarization directions, and the other two signals provide the data for the other orthogonal polarization direction. These receivers assume that the polarization of the local oscillator signal is fixed. The polarization rotator rotates the polarization of the local oscillator such that the local oscillator signal is divided equally between each of the orthogonal polarization directions. If the polarization direction of the local oscillator changes during the measurements, the amplitude of the local oscillator signal to measure the unknown signal at one polarization will be different than that used to measure the unknown signal at the orthogonal polarization. The algorithm used to combine the two polarization measurements depends on the amplitude of the local oscillator signal at one polarization having a known relationship to the amplitude of the local oscillator signal used to measure the unknown signal component at the orthogonal polarization. Hence, such variations result in errors in the measurement of the unknown signal.

A second problem with such polarization diverse receivers relates to the cost of the polarization rotator. If a waveplate is utilized to rotate the polarization, the waveplate must operate over a significant range of wavelengths, which substantially increases the cost of the waveplate. Alternatively, a Faraday rotator can be utilized to rotate the polarization; however, this requires a substantial amount of space and a magnetic field generator, which also increases the cost of the analyzer.

FIG. 1 illustrates a prior art optical heterodyne receiver. The input signal on optical fiber 21 is mixed with the local oscillator signal on optical fiber 22 by a polarization maintaining waveguide coupler 11 to generate two mixed signals. It is assumed that the input optical fiber that supplies the local oscillator signal is a polarization maintaining fiber.

The polarization of the signal on optical fiber 21 is not known, and hence, must be assumed to be different from that of the local oscillator signal (LO). Accordingly, the two mixed signals are separated into two pairs of signals in which each pair has the same polarization. The local oscillator is assumed to have a polarization as shown by arrow 31. The polarization of each of the mixed signals is rotated by 45 degrees by polarization rotator 12. The two mixed signals are then input to a walk-off crystal 13 that separates each signal into two signals having orthogonal polarizations that are separated in space. It is assumed that the axis of walk-off crystal 13 is aligned with that of the polarization of the LO signal. The resulting signals are shown at 23-26. A grin lens 14 images these signals into four corresponding optical fibers 27-30 that apply each signal to a corresponding photodiode in receiver 16. A signal processor 266 processes the signals from these photodiodes. The optical fibers 27-30 are maintained in the correct spatial positions relative to walk-off crystal 13 by a fiber holder 15.

Because the methods for processing the optical signals are known to the art, these methods will not be discussed in detail here. For the purposes of the present discussion, it is sufficient to note that the two signals corresponding to each polarization are subtracted from one another to remove the contributions that depend only on the intensity of the LO signal and the intensity of the unknown signal. The resultant two signals are then combined to provide a beat signal that is independent of the polarizations of the LO and input signal.

Receiver 10 has two problems. First, receiver 10 assumes that the polarization of the LO signal does not vary. If the polarization of the LO signal varies, an error will be introduced into the measured heterodyne signal because the LO signal will not be divided equally between the two orthogonal polarizations. Second, receiver 10 requires a polarization rotator to rotate the polarization of the mixed signals to the desired relationship with respect to the axis of walk-off crystal 13. This polarization rotator must operate over a wide range of optical frequencies, and hence, adds a significant cost to receiver 10.

SUMMARY OF THE INVENTION

In accordance with the present invention, a receiver and a method to process optical signals are disclosed. The receiver includes an optical coupler and a polarization dependent beam splitter. The optical coupler combines an input signal and a local oscillator signal into a first combined signal. The optical coupler includes a polarization filter that operates on the local oscillator to provide a linearly polarized signal having a predetermined LO polarization direction. The polarization-dependent beam splitter generates first and second component signals from the first combined signal. The first component signal has a polarization that is orthogonal to the second component signal and is spatially displaced from the second component signal in a displacement direction. The displacement direction is at an angle greater than 0 and less than 90 degrees with respect to the LO polarization direction. The first and second component signals are converted to first and second electrical signals, respectively, by first and second detectors.

BRIEF DESCRIPTION OF THE DRAWINGS

FIG. 3A is a perspective view of optical heterodyne receiver according to another embodiment of the present invention.

FIG. 3B is an end view of walk-off crystal 152.

FIG. 3C is an end view of optical fiber holder 154 shown in FIG. 3A.

DETAILED DESCRIPTION OF THE PREFERRED EMBODIMENTS OF THE INVENTION

Figure 1:
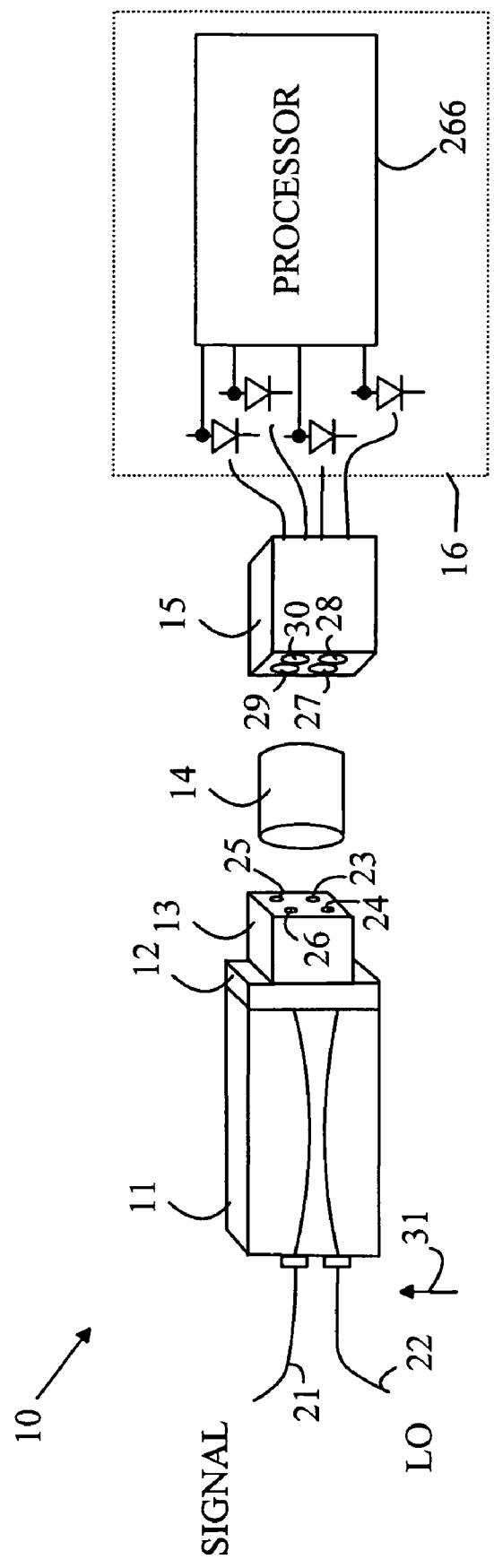
FIG. 1 illustrates a prior art optical heterodyne receiver.
Figure 2A:
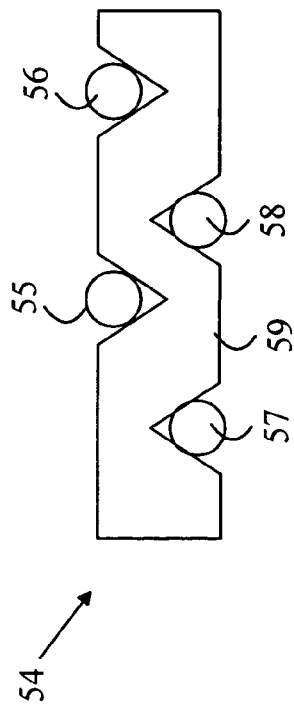
FIG. 2A is a perspective view of an optical heterodyne receiver according to one embodiment of the present invention.
Figure 2B:
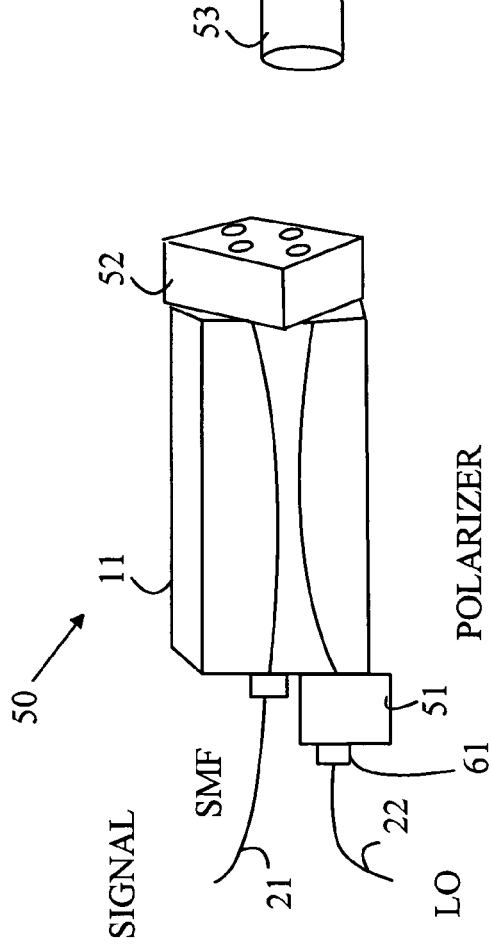
FIG. 2B is an end view of walk-off crystal 52.
Figure 2C:
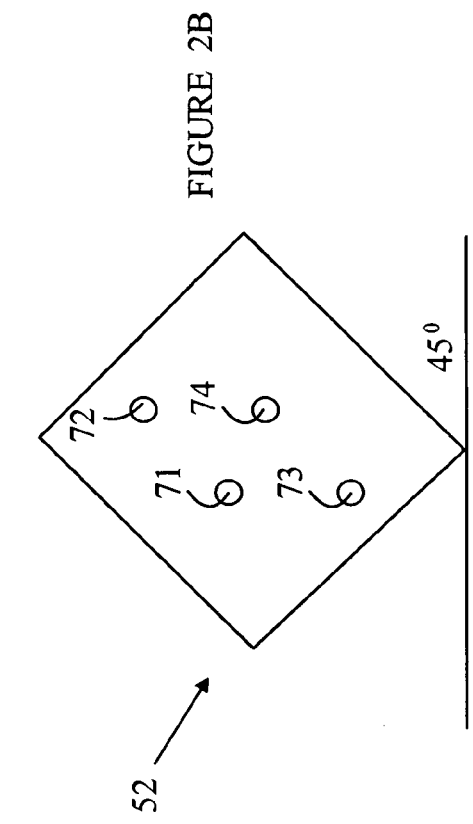
FIG. 2C is an end view of optical fiber holder 54 shown in FIG. 2A.

Refer now to FIGS. 2A-2C, which illustrate one embodiment of an optical heterodyne receiver in accordance with the invention. FIG. 2A is a perspective view of optical heterodyne receiver 50; FIG. 2B is an end view of walk-off crystal 52, and FIG. 2C is an end view of optical fiber holder 54 shown in FIG. 2A. To simplify the following discussion, those elements of optical heterodyne receiver 50 that serve functions analogous to elements discussed above with reference to FIG. 1 have been given the same numeric designations. Optical heterodyne receiver 50 utilizes a linear polarizer 51 between the LO input port 61 and the waveguide coupler 11 to set the polarization of the LO signal. Linear polarizer 51 forces the polarization of the LO signal to be linear and fixed in a direction relative to the waveguide axis of coupler 11.

A waveguide coupler exhibits birefringence. That is, light having a linear polarization parallel to the coupler birefringent axis travels at a different speed than light having a linear polarization at right angles to that axis. If the polarization of the LO signal is not aligned with one of the birefringence axes, the LO signal will become elliptically polarized and will have an unknown polarization upon leaving the coupler. Embodiments in accordance with the invention rely on the polarization direction of the LO signal being known. Hence, linear polarizer 51 is oriented such that the polarization of the LO light leaving the polarizer is aligned with a birefringence axis of coupler 11.

When the LO polarization is aligned as discussed above, any variation in the polarization of the LO signal at the input to linear polarizer 51 is converted to an amplitude or power variation while maintaining a linear and fixed polarization state at the output of the coupler. The change in output power of the LO at coupler 11 due to the introduction of polarizer 51 can easily be measured and calibrated such that the amplitude of the LO signal can be set in the conventional manner. Hence, the output amplitude of the light source used to generate the LO signal can be adjusted to compensate for any loss in amplitude or power due to polarizer 51, or the knowledge of the LO amplitude changes can be compensated by adjusting the amplitudes of the signals in receiver 16. To assure that the calibration is constant in time, a polarization maintaining optical fiber is used to connect polarizer 51 to the LO source.

This embodiment in accordance with the invention eliminates the polarization rotator discussed above by rotating walk-off crystal axis 52 by 45 degrees from the LO polarization direction at the output of coupler 11 so that the LO signal entering the walk-off crystal is separated into two signals having orthogonal polarizations and equal amplitudes. This arrangement eliminates the need for the expensive broad-band waveplate or a magnetized Faraday rotator discussed above.

However, the pattern of the optical signals exiting walk-off crystal 52 will be asymmetric as can be seen more clearly in FIG. 2B. The four beams 71-74 are now at the corners of a parallelogram. The location of these optical beams is a function of spacing between the two output waveguides at the point at which these waveguides terminate in coupler 11, the thickness of the walk-off crystal, and the walk-off angle and the angle of rotation of walk-off crystal 52. Since this pattern is imaged onto fibers 55-58 in optical fiber holder 54 by grin lens 53, a precise alignment mechanism must be included in optical fiber holder 54 to assure that these optical beams are properly imaged into fibers 55-58.

Referring to FIG. 2C, this embodiment in accordance with the invention utilizes an alignment plate having 4 V-grooves for positioning the optical fibers. The V-grooves are preferably fabricated on both sides of a substrate 59. The positions of the V-grooves and the thickness of substrate 59 are chosen to match the positions of the optical beams exiting walk-off crystal 52. The V-grooves can be etched in a silicon wafer by conventional micro-machining techniques. In one exemplary design, with the waveguides spaced at 250 microns and a walk-off crystal (Rutile) thickness of 2.5 mm, the distance between the adjacent optical beams exiting the surface of the walk-off crystal are 250 microns apart and equidistant from one another. This distance is invariant to the rotation of the crystal. For example, by rotating the crystal 45 degrees from the axis of polarization, the pattern of the beams will change from a square to an equilateral parallelogram as shown in FIG. 2B. The fiber positioning plate can be fabricated on both sides of a silicon wafer using well-established etching techniques. The grooves are set such that the fibers are separated vertically by a distance of 177 microns and horizontally by a distance of 250 microns.

The above-described embodiments in accordance with the invention utilize a 2×2 combining coupler. However, embodiments that utilize N×N couplers can also be constructed. Refer now to FIG. 3A, which illustrates an optical heterodyne receiver according to an embodiment in accordance with the invention having a 3×3 combiner coupler. FIG. 3A is a perspective view of optical heterodyne receiver 150; FIG. 3B is an end view of walk-off crystal 152, and FIG. 3C is an end view of optical fiber holder 154 shown in FIG. 3A. Optical heterodyne receiver 150 utilizes a linear polarizer 151 between the LO input port and the polarization maintaining waveguide coupler 111 to set the polarization of the LO signal as discussed above. Linear polarizer 151 forces the polarization of the LO signal to be linear and parallel to the birefringence axis of polarization maintaining coupler 111. The LO signal is preferably received via a polarization maintaining optical fiber 123.

The pattern of the optical signals exiting walk-off crystal 152 will again be asymmetric as can be seen more clearly in FIG. 3B. The six beams 171-176 are formed at the output of walk-off crystal 152. The location of these optical beams is a function of spacing between the three output waveguides at the point at which these waveguides terminate in coupler 111, the thickness of the walk-off crystal, and the angle of rotation of walk-off crystal 152. This pattern is imaged onto fibers 155-160 in optical fiber holder 154 by grin lens 153 in a manner analogous to that described above. Fibers 155-160 transfer the imaged pattern to photodetectors 116 in the receiver. Referring to FIG. 3C, fiber holder 154 can again be constructed from an alignment plate having 6 V-grooves for positing the optical fibers in a manner analogous to that discussed above.

The above-described embodiments in accordance with the invention utilize a polarization-dependent beam splitter constructed from a rutile walk-off crystal to separate each of the beams from the polarization-maintaining waveguide coupler into two beams having orthogonal polarizations. However, other forms of polarization-dependent beam splitters can be utilized. In general, any polarization-dependent beam splitter separates each incoming beam into two beams that have orthogonal polarizations and that are separated in space. Although the polarizing beam splitter is described as a single device, the polarizing beam splitter may include multiple beam splitters in configurations that accomplish the task of splitting an incoming beam based on beam polarization.

In the embodiments described above, the polarization of the LO oscillator was set to be at an angle of 45 degrees with respect to the axis of the polarization-dependent beam splitter. This arrangement is preferred because it provides LO signals having orthogonal polarization components that have equal amplitudes. However, an embodiment in accordance with the invention in which the LO signal is at other angles can be utilized and still provide a working device. In principle, any arrangement that provides two non-zero orthogonal components having a known intensity relationship with respect to one another can be utilized. The difference in intensities can be taken into account by the signal processing processor 266 associated with receiver 16 shown in FIG. 1.

The above-described embodiments in accordance with the invention have utilized electromagnetic radiation signals in the optical band. However, embodiments in accordance with the invention that operate in other wavelength ranges of the electromagnetic radiation spectrum can also be utilized if suitable beam couplers, beam splitters, polarization filters, and signal detectors are available. For example, embodiments in accordance with the invention that operate in the infrared spectrum can be constructed.

The above-described embodiments in accordance with the invention utilize optical fibers as waveguides for coupling signals to the photodiodes in the receiver. However, embodiments in which the signals leaving the polarization-dependent beam splitter are imaged directly onto an array of photodetectors can also be utilized. Similarly, the other optical fibers discussed above can be replaced with any suitable waveguide without departing from the teachings in accordance with the invention.

The embodiments described above depend on a local oscillator that is preferably a laser whose frequency can be swept through some predetermined range while maintaining a reproducible polarization in the output light signal. However, embodiments in accordance with the invention do not depend on this exemplary form of LO. For example, embodiments in which the laser frequency is fixed can be utilized advantageously in measurements that depend on a limited number of frequencies in the input light signal.

The above-described embodiments in accordance with the invention generate at least two combined optical signals from the input optical signal and the LO. Each optical signal is then separated into orthogonally polarized components and the components corresponding to each of the combined optical signals are then subtracted. This arrangement reduces noise associated with the intensity of the input optical signal and the LO optical signal. If such noise is not significant in a particular application, an embodiment in which only one of the combined optical signals is utilized can be constructed, and hence, reduce the overall cost and complexity of the receiver. In such an embodiment, the polarization dependent beam splitter would generate only two optical signals, one corresponding to each of the orthogonal polarizations. The data processor would then combine these two signals to provide the polarization diverse output signal.

The above-described embodiments utilize optical fibers to couple the light from the walk-off crystal to the photodetectors 81-84 in receiver 16. However, embodiments in which these photodetectors are illuminated directly to beams 71-74 shown in FIG. 2A can also be constructed if the walk-off angle of the walk-off crystal provides sufficient spatial separation of the beams to avoid significant cross-talk at the photodetectors.

Various modifications in accordance with the invention will become apparent to those skilled in the art from the foregoing description and accompanying drawings. Accordingly, the present invention is to be limited solely by the scope of the following claims.

What is claimed is:

1. A receiver, comprising:
    a polarization-maintaining waveguide optical coupler for combining an input signal and a linearly-polarized local oscillator signal into a first combined signal, said optical coupler having a coupler birefringent axis and comprising a first end surface and a second end surface, said second end surface opposite said first end surface;
    a polarization filter attached to said first end surface of said optical coupler for filtering a local oscillator signal having an arbitrary polarization to form said linearly-polarized local oscillator signal with a polarization direction parallel to said coupler birefringent axis;
    a polarization-dependent beam splitter having a walk-off axis direction, and attached to said second end surface of said optical coupler with said walk-off axis direction at an angle greater than zero and less than ninety degrees with respect to said coupler birefringent axis, said polarization-dependent beam splitter for generating first and second component signals from said first combined signal, said first component signal having a polarization that is orthogonal to said second component signal, said first component signal being spatially displaced from said second component signal;
    a first detector for converting said first component signal into a first electrical signal; and
    a second detector for converting said second component signal into a second electrical signal.

2. The receiver of claim 1, wherein said polarization-dependent beam splitter comprises a rutile walk-off crystal.

3. The receiver of claim 1, wherein said angle is chosen such that said polarization-dependent beam splitter separates said linearly-polarized local oscillator signal into components having orthogonal polarizations and substantially equal amplitudes.

4. The receiver of claim 1, further comprising third and fourth detectors, and wherein said optical coupler further combines said input signal and said linearly-polarized local oscillator signal into a second combined signal and wherein said polarization-dependent beam splitter further generates third and fourth component signals from said second combined signal, said third and fourth component signals having polarizations that are orthogonal to one another and being separated spatially from each other and from said first and second component signals, said third detector converting said third component signal into a third electrical signal and said fourth detector converting said fourth component signal into a fourth electrical signal.

5. A method for characterizing an input optical signal, the method comprising:
providing a polarization-maintaining waveguide optical coupler having a coupler birefringence axis and comprising an end surface;
providing a polarization-dependent beam splitter having a walk-off axis direction and attached to said end surface with said walk-off axis direction at an angle greater than zero and less than ninety degrees with respect to said coupler birefringent axis;
receiving a local oscillator signal;
linearly polarizing said received local oscillator signal to form a linearly polarized local oscillator signal polarized parallel to said coupler birefringence axis;
using said optical combiner, combining said linearly-polarized local oscillator signal with said input optical signal to provide a first combined signal;
using said polarization-dependent beam splitter, spatially separating said first combined signal into first and second component signals, said first component signal spatially displaced from said second component signal; and converting said first and second component signals into first and second electrical signals.

6. The method of claim 5, wherein said polarization-dependent beam splitter comprises a rutile walk-off crystal.

7. The method of claim 5, wherein said angle is chosen such that said polarization-dependent beam splitter divides said linearly polarized local oscillator signal into components having orthogonal polarizations and substantially equal amplitudes.

8. The method of claim 5, wherein:
said input signal and said linearly polarized local oscillator signal are further combined into a second combined signal using said optical coupler;
said polarization-dependent beam splitter divides said second combined signal into third and fourth component signals, said third and fourth component signals having polarizations that are orthogonal to one another and being separated spatially from each other and from said first and second component signals; and
said third and fourth component signals are converted to third and fourth electrical signals.

* * * * *